US012647894B2

(12) United States Patent
Knudsen et al.

(10) Patent No.: US 12,647,894 B2
(45) Date of Patent: Jun. 2, 2026

(54) TIMING ALIGNMENT IN TELECOMMUNICATION SYSTEMS

(71) Applicant: Nokia Technologies Oy, Espoo (FI)

(72) Inventors: Knud Knudsen, Aabybro (DK); Benny Vejlgaard, Gistrup (DK); Jan Torst Hviid, Klarup (DK); Johannes Harrebek, Aalborg (DK); Oana-Elena Barbu, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 312 days.

(21) Appl. No.: 18/385,006

(22) Filed: Oct. 30, 2023

(65) Prior Publication Data

US 2024/0147377 A1 May 2, 2024

(30) Foreign Application Priority Data

Nov. 2, 2022 (EP) ..................................... 22205154

(51) Int. Cl.
*H04W 52/02* (2009.01)

(52) U.S. Cl.
CPC ............................... *H04W 52/0248* (2013.01)

(58) Field of Classification Search
CPC ......... H04W 52/0248; H04W 52/0229; H04W 52/0216; Y02D 30/70
See application file for complete search history.

(56) References Cited

U.S. PATENT DOCUMENTS

2019/0187572 A1 6/2019 Nam et al.
2019/0327679 A1 10/2019 Gupta et al.

2021/0219234 A1 7/2021 Hwang et al.
2022/0256468 A1* 8/2022 Zou ................... H04W 52/0245
2022/0394619 A1* 12/2022 Berggren ............. H04W 76/28
2023/0063026 A1* 3/2023 Reial ................ H04W 52/0235

(Continued)

FOREIGN PATENT DOCUMENTS

WO WO 2021/089284 A1 5/2021
WO WO 2021/162623 A1 8/2021

OTHER PUBLICATIONS

EESR (22205154.2) Apr. 28, 2023, 8 pgs.

(Continued)

*Primary Examiner* — Farid Seyedvosoghi
(74) *Attorney, Agent, or Firm* — Lippes Mathias LLP

(57) ABSTRACT

Aspects and embodiments relate generally to mechanisms to support power saving in a wireless communication network and more particularly to supporting discontinuous reception of a wake-up signal receiver at an apparatus comprising a wake-up signal receiver and a main radio receiver. One aspect provides an apparatus, comprising: a main radio receiver; a wake-up signal receiver; and a timer. The wake-up signal receiver comprises: circuitry configured to receive at least a portion of a broadcast message; circuitry configured to evaluate the received portion of the broadcast message to determine a time marker; and circuitry configured to provide the time marker to the timer. The apparatus may comprise a UE and may therefore be configured to align internal time keeping with the time keeping of a network, thus allowing discontinuous reception and associated energy savings, without transmission of additional specific synchronisation messaging by a network.

18 Claims, 12 Drawing Sheets

(56) References Cited

U.S. PATENT DOCUMENTS

2025/0267577 A1 * 8/2025 Fu ...................... H04W 52/028

OTHER PUBLICATIONS

"IEEE Standard for Information Technology—Telecommunications and Information Exchange between Systems—Local and Metropolitan Area Networks-Specific Requirements—Part 11: Wireless LAN Medium Access Control (MAC) and Physical Layer (PHY) Specifications—Amendment 3: Wake-Up Radio Operation," in IEEE Std 802.11ba-2021 (Amendment to IEEE Std 802.11-2020 as amendment by IEEE Std 802.11ax-2021, and IEEE Std 802.11ay-2021) , vol. , No. , pp. 1-180, Oct. 8, 2021, doi: 10.1109/IEEESTD.2021. 9570110.
C. Salazar, A. Cathelin, A. Kaiser and J. Rabaey, "A 2.4 GHz Interferer-Resilient Wake-Up Receiver Using A Dual-IF Multi-Stage N-Path Architecture," in IEEE Journal of Solid-State Circuits, vol. 51, No. 9, pp. 2091-2105, Sep. 2016, doi: 10.1109/JSSC.2016. 2582509.
T. J. Odelberg, J. Im and D. D. Wentzloff, "A 2.1mW—109dBm NB-IoT Wake-Up Receiver," 2021 IEEE Radio Frequency Integrated Circuits Symposium (RFIC), Atlanta, GA, USA, 2021, pp. 235-238, doi: 10.1109/RFIC51843.2021.9490494.
Mads Lauridsen, "Sleep Modes for Enhanced Battery Life of 5G Mobile Terminals" 2016 IEEE 83rd Vehicular Technology Conference (VTC Spring), May 15-18, 2016, DOI: 10.1109/VTCSpring. 2016.7504476.

\* cited by examiner

Power consumption: nw, uw level

Sensitivity: low to -97 dBm

| | Moody iSSCC'18 | | Jiang ISSCC'17[1] | Roberts ISSCC'16[2] | Sadagopan RFIC'17[3] | Salazar ISSCC'15 | Abe VLSI'14 | Pletcher ISSCC'08 |
|---|---|---|---|---|---|---|---|---|
| Technology | 130 nm | | 180 nm | 65 nm | 65 nm | 65 nm | 65 nm | 90 nm |
| Carrier Frequency | 151.8MHz | 433MHz | 113.5 MHz | 2.4 GHz | 2.4 GHz | 2.4 GHz | 925.4MHz | 2 GHz |
| Power Consumption | 7.4 nw | 7.4 nw | 4.5 nW | 236 nW | 365 nW | 99 µW | 45.5 µW | 52 µW |
| Data Rate | 200 bps | 200 bps | 300 bps | 8.192 kbps | 2.5 kbps | 10 kbps | 50 kbps | 100 kbps |
| Dissipated Energy per bit | 37 pJ | 37 pJ | 15 pJ | 28.8 pJ | 146 pJ | 9900 pJ | 910 pJ | 520 pJ |
| Non-constant Envelope Interferer Rejection | Intergrated Auto Offset Control Loop | | N/A | N/A | N/A | N/A | 2-Step Wakeup | N/A |
| Out-of-band Interferer Rejection Method | High-Q FE Transformer | High-Q FE Transformer | High-Q FE Transformer | Matching Network | High-Q FE Co-Design | N-path filter | 2-Step Wakeup | MEMS Filter |
| Sensitivity | -76 dBm[1] | -71 dBm[1] | -69 dBm[1] | -56.5 dBm[2] | -61.5 dBm[2] | -97 dBm[2] | -87 dBm[2] | -72 dBm[2] |
| Sensitivity with interference | -76 dBm[3] | N/A | N/A | N/A | -58.5 dBm[4] | -94 dBm[5] | -84 dBm[4] | N/A |
| Die Area | 1.95 $mm^2$ | | 6 $mm^2$ | 2.25 $mm^2$ * | 1.1 $mm^2$ * | 0.0576 $mm^2$ * | 1.27 $mm^2$ * | 0.1 $mm^2$ * |

FIG. 2

Table AC-2 — Example Values for the Sequence S$^{LDR}$ used for the Construction of the 4 μs duration MC-OOK On Symbol

| Index | Sequence S$^{LDR}$ |
|---|---|
| Example 1 | {-1, 1, 1, 1, -1, 1, 0, -1, -1, -1, 1, -1, -1} |
| Example 2 | $$\frac{\{1+f, -1+f, -1+f, 1+f, -1+f, 1-f, 0, 1+f, 1+f, 1-f, 1+f, -1-f, -1+f\}}{\sqrt{2}}$$ |
| Example 3 | $$\frac{\{-1+f, 1+f, -1+f, 1+f, -1-f, 1-f, 0, 1-f, 1+f, -1-f, -1-f, 1+f, 1+f\}}{\sqrt{2}}$$ |
| NOTE — For Example 2 and Example 3, the scaling factors are chosen so that the MC-OOK On Symbol is normalized to have the same power as the other examples. | | a) Data symbol for 62.5 kdps

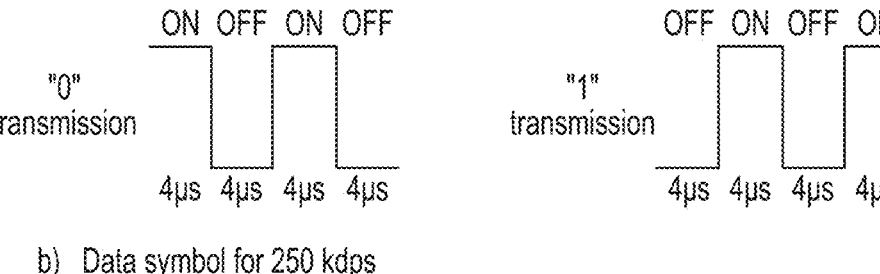

b) Data symbol for 250 kdps

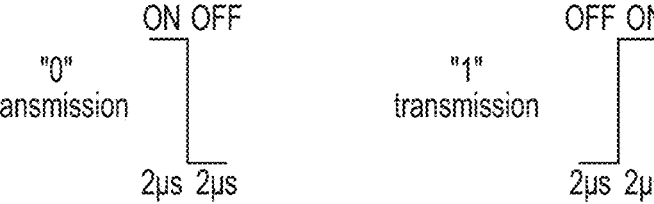

TIMING ALIGNMENT IN TELECOMMUNICATION SYSTEMS

TECHNOLOGICAL FIELD

Various example embodiments relate generally to mechanisms to support power saving in a wireless communication network and more particularly to supporting discontinuous reception of a wake-up signal receiver at an apparatus comprising a wake-up signal receiver and a main radio receiver.

BACKGROUND

Arrangements relate to enhancements for User Equipment (UE) energy saving in 5G New Radio (NR), and particularly focus on UE and other similar devices which have extended battery lifetime targets of, for example, weeks or years.

Mechanisms for energy saving include provision of a separate, low-power, wake-up receiver at a UE. Provision of such a receiver can reduce UE power consumption. The intention of such a wake-up receiver is that the main radio of the UE can be in a sleep mode (or even powered off) to achieve power saving and be activated only upon reception of a wake-up signal, received by the wake-up receiver, from the network.

In other words, a network is configured to trigger a UE to wake-up when needed in an event-driven manner, by transmitting a special Wake Up Signal (WUS) to the UE. A dedicated low-power WUS receiver monitors for the WUS at the UE. When the WUS receiver receives the WUS for a UE, the WUS receiver is configured to trigger activation and wake-up of an ordinary NR transceiver and communication can commence.

Average power consumption of a wake-up receiver having reasonable sensitivity to receive a wake-up signal may remain higher than desired if the wake-up receiver is "always on". One way to provide energy saving is to provide ways in which the wake-up receiver can operate such that it is not always on.

Some adaptations to wireless communication devices, infrastructure and signalling may be required to support such energy saving.

BRIEF SUMMARY

The scope of protection sought for various example embodiments of the invention is set out by the independent claims. The example embodiments and features, if any, described in this specification that do not fall under the scope of the independent claims are to be interpreted as examples useful for understanding various embodiments of the invention.

According to various, but not necessarily all, example embodiments of the invention there is provided an apparatus, comprising: a main radio receiver; a wake-up signal receiver; and a timer; wherein the wake-up signal receiver comprises: means to receive at least a portion of a broadcast message; means to evaluate the received portion of the broadcast message to determine a time marker; and means to provide the time marker to the timer.

The portion of the broadcast message may comprise a frequency range having a region in a time domain comprising resource elements having zero amplitude and an adjacent region in the time domain comprising resource elements having a constant amplitude.

The constant amplitude may comprise: substantially maximum amplitude.

The broadcast message may comprise a message regularly transmitted within the network with a known period between transmissions.

The broadcast message may comprise: a Synchronization Signal Block (SSB).

The means to evaluate the received portion of broadcast message may be configured to determine the time marker based upon an evaluation of a transition in the received portion between resource elements having zero amplitude and resource elements having a constant amplitude.

The means to receive at least a portion of the broadcast message may comprise a filter configured to filter a received signal, and select a signal bandwidth centred upon a centre of the portion of the broadcast message.

The filter may comprise a low pass filter dedicated filter. The filter may comprise a bandpass filter. The filter bandwidth may be tunable. The filter bandwidth may be adjustable.

The apparatus may comprise: means to calculate a wake-up signal occasion based upon the determined time marker.

The means to calculate a wake-up signal occasion may be configured to calculate the wake-up signal occasion based upon a fixed timing offset to the determined time marker.

The timer may be configured to predict a wake-up signal occasion based upon the determined time marker.

The means to receive at least a portion of a broadcast message may be configured to periodically receive at least a portion of a broadcast message.

The means to evaluate the received portion of the broadcast message to determine a time marker may be configured to determine a time marker in relation to a series of received portions of broadcast message.

The apparatus may comprise: means to compare timing kept by the timer to timing determined from time markers determined in relation to a series of received portions of broadcast message.

The apparatus may comprise: means to estimate a frequency error of a reference clock of the timer based upon a comparison of timing kept by the timer to timing determined from time markers determined in relation to a series of received portions of broadcast message.

The apparatus may comprise: means to adjust timing kept by the timer based upon the estimated frequency error.

The means to compare timing may be configured to apply a linear fit to the time markers determined in relation to the series of received portions of broadcast message.

The apparatus may comprise: means to adjust how often the wake-up receiver is awake to receive the portion of the broadcast message.

The means to adjust how often the wake up receiver is awake may be configured to adjust a period between wake ups in dependence upon the linear fit to the time markers determined in relation to the series of received portions of broadcast message.

According to various, but not necessarily all, example embodiments of the invention there is provided an apparatus as described above wherein the means comprise: at least one processor; and at least one memory storing instructions that, when executed by the at least one processor, cause the performance of the apparatus.

According to various, but not necessarily all, example embodiments of the invention there is provided a method, performed by a wake-up signal receiver of an apparatus comprising a main radio receiver, the wake-up signal receiver; and a timer, the method comprising: receiving at least a portion of a broadcast message; evaluating the received portion of the broadcast message to determine a time marker; and providing the time marker to the timer.

The portion of the broadcast message may comprise: a frequency range having a region in a time domain comprising resource elements having zero amplitude and an adjacent region in the time domain comprising resource elements having a constant amplitude.

The constant amplitude may comprise: substantially maximum amplitude.

The broadcast message may comprise: a message regularly transmitted within the network with a known period between transmissions.

The broadcast message may comprise: a Synchronization Signal Block (SSB).

Evaluating the received portion of broadcast message may comprise: determining the time marker based upon an evaluation of a transition in the received portion between resource elements having zero amplitude and resource elements having a constant amplitude.

Receiving at least a portion of the broadcast message may comprise providing a filter configured to filter a received signal, and selecting a signal bandwidth centred upon a centre of the portion of the broadcast message.

The filter may comprise a low pass filter dedicated filter. The filter may comprise a bandpass filter. The filter bandwidth may be tunable. The filter bandwidth may be adjustable.

The method may comprise: calculating a wake-up signal occasion based upon the determined time marker.

Calculating a wake-up signal occasion may comprise: calculating the wake-up signal occasion based upon a fixed timing offset to the determined time marker.

The timer may be configured to predict a wake-up signal occasion based upon the determined time marker.

Receiving at least a portion of a broadcast message may comprise periodically receiving at least a portion of a broadcast message.

Evaluating the received portion of the broadcast message to determine a time marker may comprise determining a time marker in relation to a series of received portions of broadcast message.

The method may comprise: comparing timing kept by the timer to timing determined from time markers determined in relation to a series of received portions of broadcast message.

The method may comprise: estimating a frequency error of a reference clock of the timer based upon a comparison of timing kept by the timer to timing determined from time markers determined in relation to a series of received portions of broadcast message.

The method may comprise: adjusting timing kept by the timer based upon the estimated frequency error.

Comparing timing may comprise applying a linear fit to the time markers determined in relation to the series of received portions of broadcast message.

The method may comprise: adjusting how often the wake-up receiver is awake to receive the portion of the broadcast message.

Adjusting how often the wake up receiver is awake may comprise adjusting a period between wake ups in dependence upon the linear fit to the time markers determined in relation to the series of received portions of broadcast message.

According to various, but not necessarily all, example embodiments of the invention there is provided a computer program product which, when executed by a processor on an apparatus comprising a wake-up signal receiver, a main radio receiver, and a timer, is operable to control the apparatus to perform steps comprising: receiving at least a portion of a broadcast message; evaluating the received portion of the broadcast message to determine a time marker; and providing the time marker to the timer.

According to various, but not necessarily all, example embodiments of the invention there is provided an apparatus, comprising: at least one processor; and at least one memory including computer program code; the at least one memory and the computer program code configured to, with the at least one processor, cause the apparatus at least to perform: receiving at least a portion of a broadcast message; evaluating the received portion of the broadcast message to determine a time marker; and providing the time marker to a timer.

The apparatus may comprise: a wake-up signal receiver, a main radio receiver, and a timer.

According to various, but not necessarily all, example embodiments of the invention there is provided an apparatus, comprising: a main radio receiver; a wake-up signal receiver; and a timer; wherein the wake-up signal receiver comprises: circuitry configured to receive at least a portion of a broadcast message; circuitry configured to evaluate the received portion of the broadcast message to determine a time marker; and circuitry configured to provide the time marker to the timer.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 2 is a table for comparing sensitivity and power consumption of various typical almost zero-power receivers;

FIG. 3 illustrates schematically example sequences used to generate an ON symbol by an OFDM transmitter;

DETAILED DESCRIPTION

Figure 1:
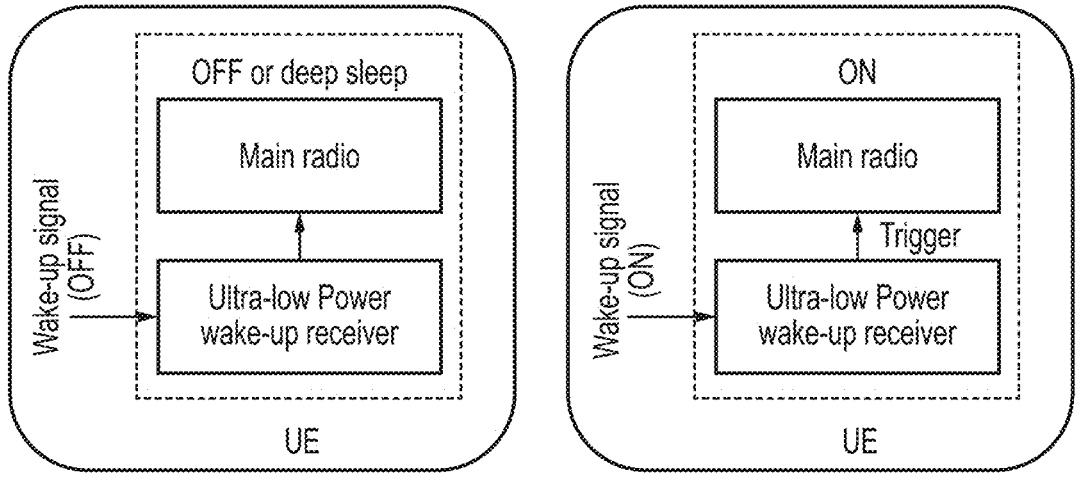
FIG. 1 illustrates schematically operation of user equipment UE comprising a low-power wake-up receiver (WUR)

Before discussing the example embodiments in any more detail, first the relevant context which motivates approaches in accordance with arrangements is described.

Arrangements relate to enhancements for User Equipment (UE) energy savings in 5G New Radio (NR), and particularly focuses on UE and other similar devices which have extended battery lifetime targets of, for example, weeks or years.

Such devices include those without a continuous energy source, for example, UE and other devices which are configured to use small rechargeable and/or non-rechargeable single coin cell batteries. Such UE and devices include those envisaged to support vertical use cases. In other words, devices with wireless communication ability may be used in support of solutions intended for one purpose in a specific context (eg a particular manufacturing process, or provision of a service, for example, energy supply). Devices with communication ability may, for example, include sensors and actuators that are deployed extensively for monitoring, measuring, charging, and similar. Often, such vertical use devices comprise batteries which are not rechargeable but are expected to last at least a few years. Furthermore, devices for which it is desired to provide a long battery life, or low energy use, may include wearables including: smart watches, smart rings, eHealth related devices, and medical monitoring devices. For these devices, it is challenging to sustain a battery life of up to 1-2 weeks, as required, with typical battery capacity.

Some of the UE and devices which fall into the categories of the type set out above (for example, sensors, actuators and wearables) not only require a long battery life, but are also required to support latency-critical services. Examples of such services supportable by UE devices include: sensors for fire detection and extinguishing. In such latency critical cases, use of techniques such as extended Discontinuous Reception (eDRX) which allow a UE to extend a periodicity according to which the UE wakes up to monitor for paging (thereby reducing average power consumption), are not useful choices, since they result in an unacceptable communication latency.

Thus alternative mechanisms to enable UE power saving are desirable.

Such alternative mechanisms include provision of a separate, low-power, wake-up receiver at the UE. Such a low-power, wake-up receiver is to provide a simple detector which can operate to detect a wakeup signal using very low power. To facilitate such simple detectors and to allow in-band Wake Up Signal (WUS) signalling that can co-exist with legacy UE, it is likely that 3GPP will select a WUS signal inspired by the one defined in 802.11ba for WiFi. This signal uses MC-OOK (Multi-Carrier ON/OFF Keying) which through use of an envelope detector, can allow a receiver to implement ON/OFF keying.

An advantage of a WUS signal having such a form is that it can easily be generated by an OFDM transmitter in a gNB and it can be received with a very simple and power efficient receiver as explained below.

Provision of a wake-up receiver can reduce UE power consumption. The intention of the wake-up receiver is that the main radio of the UE can be in a sleep mode (or even powered off) to achieve power saving and be activated only upon reception of a wake-up signal, received by the wake-up receiver, from the network.

In other words, the network is configured to trigger a UE to wake-up when needed in an event-driven manner, by transmitting a special Wake Up Signal (WUS) to the UE. The dedicated low-power WUS receiver monitors for the WUS at the UE. When the WUS receiver receives the WUS for a UE, the WUS receiver is configured to trigger activation and wake-up of an ordinary NR transceiver and communication can commence.

The ultra-low power receiver wakes up the main radio transceiver. Otherwise, the main radio is OFF or kept in a deep sleep mode. FIG. 1 illustrates schematically such operation of user equipment UE comprising a low-power wake-up receiver (WUR); It is assumed that the low-power wake-up receiver is operated in an always 'on' manner and achieve very low power consumption. Such low-power receivers are designed to consume significantly less power than a traditional NR transceiver. Such power efficiency can be achieved by design, for example, by implementation of an appropriate simple wake up signal (WUS) and the use of appropriate dedicated hardware for monitoring of such a WUS. Such hardware may have limited functionality and may, for example, only be able to receive signals which have the simplicity of the implemented WUS.

There is a trade-off between power consumption achievable and RF sensitivity (coverage) of a low power WUS receiver. In particular, a low power WUS receiver will typically have a sensitivity which is usually significantly worse than the main LTE or WIFI receiver. By way of illustration: standards (RWS-210168) set out that:

Main receiver in NR idle

RF sensitivity −100 dBm is associated with an average power consumption of 30-50 mW.

Typically, the NR receiver can operate at around −120 dBm.

Low power WUS receiver

For example, an almost zero power receiver using a passive circuit with envelope detector RF sensitivity ~−70/80 dBm with an average power consumption of 7.4 nW.

This means a low power WUS receiver can offer 100× power saving, but with some sensitivity degradation.

FIG. 2 is a table illustrating various typical almost zero-power receivers comparing sensitivity and power consumption. The typical receivers illustrated use a CMOS RF front-end with on-off-key (OOK) based on energy detection.

Low power receivers are supported as a result of appropriate implementation of on off signals and hardware selection as set out in more detail below:

On-Off-Key (OOK) and Low Power Wake Up Receiver (WUR)

FIG. 3 illustrates schematically example sequences used to generate an ON symbol by an OFDM transmitter. The sequences use maximum amplitude of Resource Elements (except a DC carrier in the middle) thereby maximizing energy in a Multi Carrier (MC) OOK "ON" symbol. When transmitting the "OFF" symbol, the sequences use an amplitude of 0, thereby minimizing the energy in an MC-OOK "OFF" symbol.

Each transmitted bit ("0" or "1") is translated into a sequence of alternating "ON" and "OFF" symbols, where the sub-carriers in the ON symbols have high energy (where all sub carriers except DC have maximum amplitude) and the sub carriers in the OFF symbols are all 0.

Wake Up Receiver (WUR) Components

Figure 4:
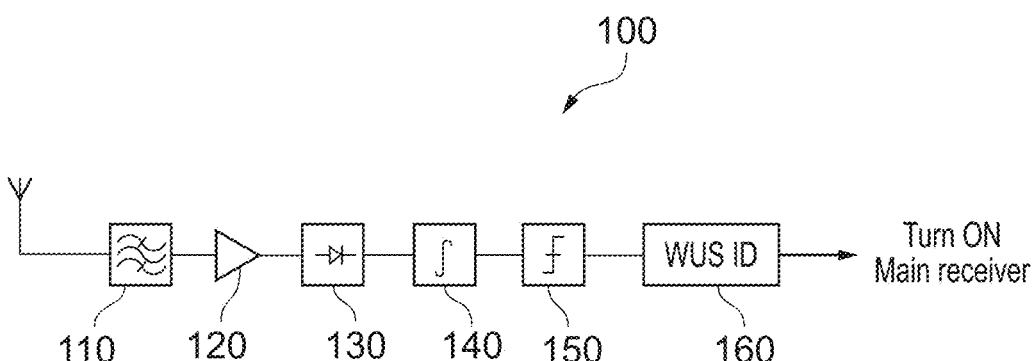
FIG. 4 illustrates schematically main components of a simple low power receiver.

FIG. 4 illustrates schematically main components of one possible simplified OOK receiver, which would also work for a MC-OOK signal as set out above. The receiver 100 comprises: a bandpass filter 110 for channel selection; a low noise amplifier (LNA) 120, and envelope detector 130, an integrator 140, a comparator 150 and a correlator 160.

The bandpass filter 110 is configured to remove the signal outside the frequency range covered by the subcarriers in the MC-OOK signal. The LNA 120 is configured to amplify the signal before it is fed into the envelope detector 130. After passing through the envelope detector, the signal comprises a low frequency signal being either: low when a 0 is received or high when a 1 is received. By integrating the signal over each symbol duration using integrator 140, the signal noise is suppressed, and the comparator 150 is them operable to determine whether the received symbol is a 0 or 1 by comparing with an average signal level. Finally, the received bit stream is fed to a correlator which correlates the detected bit sequence with the sequence which is expected for a WUS message such as those illustrated in FIG. 3.

A receiver such as that shown in FIG. 4 does not require a mixer, an analogue to digital converter (ADC) or advanced baseband processing, so it represents a very power efficient solution. In practice, any real WUS receiver will include some further complexity, but FIG. 4 serves to illustrate that the main components of the receiver can be very simple which is why the OOK and MC-OOK signals illustrated in FIG. 3 are attractive modulation schemes ideal for selection if designing a WUS signal for a low power wake-up receiver.

It is a challenge to achieve an average power consumption of less than 100 uW and also high sensitivity in a 5G network if implementing an "always on" low power Wake Up Receiver.

Once possible mechanism to support power savings is that of adopting the concept of discontinuous reception in the wakeup receiver. If the receiver uses discontinuous reception, the power consumption during the short ON periods can be significantly higher than the required average power consumption. Such an implementation of course, is subject to a latency restriction and may require provision of a more advanced low power receiver than the kind illustrated in FIG. 4. For example, an appropriate receiver may include a Low Noise Amplifier, which can improve the noise figure of the low power receiver and thereby also improve the sensitivity (and coverage) of the receiver.

Discontinuous reception requires that a receiver maintains a timing alignment with a transmitter, such that they have common understanding about timing of wakeup occasions. In other words: the transmitter is configured to transmit WUS messages to the receiver at a wakeup occasion since the receiver will only be configured to be receiving during such a wakeup occasion period.

In order for a wakeup receiver operating using DRX methods to be able to maintain timing alignment with a transmitter, the receiver needs a signal which it can use to track the timing of the transmitter.

Whilst it is possible to introduce a wake-up receiver-specific synchronisation signal, for example, a "WUS beacon" which is periodically broadcast by a transmitter in order to keep any wake-up receiver(s) aligned in time to the transmitting nodes in a network, provision of such a specific signal comes at the cost of frequent and inefficient transmission of the WUS beacon in an entire registration area. Therefore, a transmitting node may decide not to provide a WUS beacon. This may have the result that a UE cannot apply discontinuous WUS reception, but instead needs to have the WUR receiver continuously receiving, or alternatively revert to the legacy WUS signal not using the WUR receiver.

SSB Blocks

The SSB (Synchronization Signal Block, 3GPP 38.211 section 7.4.2 and 7.4.3) is normally used within a network to support timing alignment, frequency adjustment and MIB (Master Information Block) reception.

According to standards, The SSB block comprises:

A PSS (Primary Synchronization Sequence)

A SSS (Secondary Synchronization Sequence)

A PBCH (Physical Broadcast Channel) block divided across different symbols and subcarriers Unused sub-carriers surrounding the PSS and SSS.

Having set out the context surrounding arrangements, a general overview of arrangements described is provided.

Arrangements provide an apparatus, comprising: a main radio receiver; a wake-up signal receiver; and a timer. The wake-up signal receiver comprises means to receive at least a portion of a broadcast message; means to evaluate the received portion of the broadcast message to determine a time marker; and means to provide the time marker to the timer. The apparatus may comprise any suitable UE-type device provided with a low power receiver and a main radio receiver.

Arrangements described recognise that it is possible to use some characteristics of an existing synchronisation signal, for example, the SSB block, to allow a WUR receiver to stay time aligned with, for example, a gNB, thus allowing a UE to achieve power saving by avoiding a UE need to activate a main, more power consuming, 5G modem.

Arrangements provide mechanisms by which discontinuous operation of a WUR is enabled, without the network needing to spend radio resources on a dedicated WUS beacon. The benefit from a UE point of view is that the UE can use discontinuous reception by the WUR receiver, and thereby achieve significant power saving.

According to arrangements, a UE with a WUR operating in a discontinuous mode can maintain timing alignment with a transmitting node, for example, a gNB. Timing alignment allows the WUR baseband to calculate the time of the WUS occasion even if the clock of the baseband is prone to drift relative to the clock of gNB. This ability to maintain timing alignment is a pre-requisite for enabling DRX mode in the WUR baseband.

Figure 5:
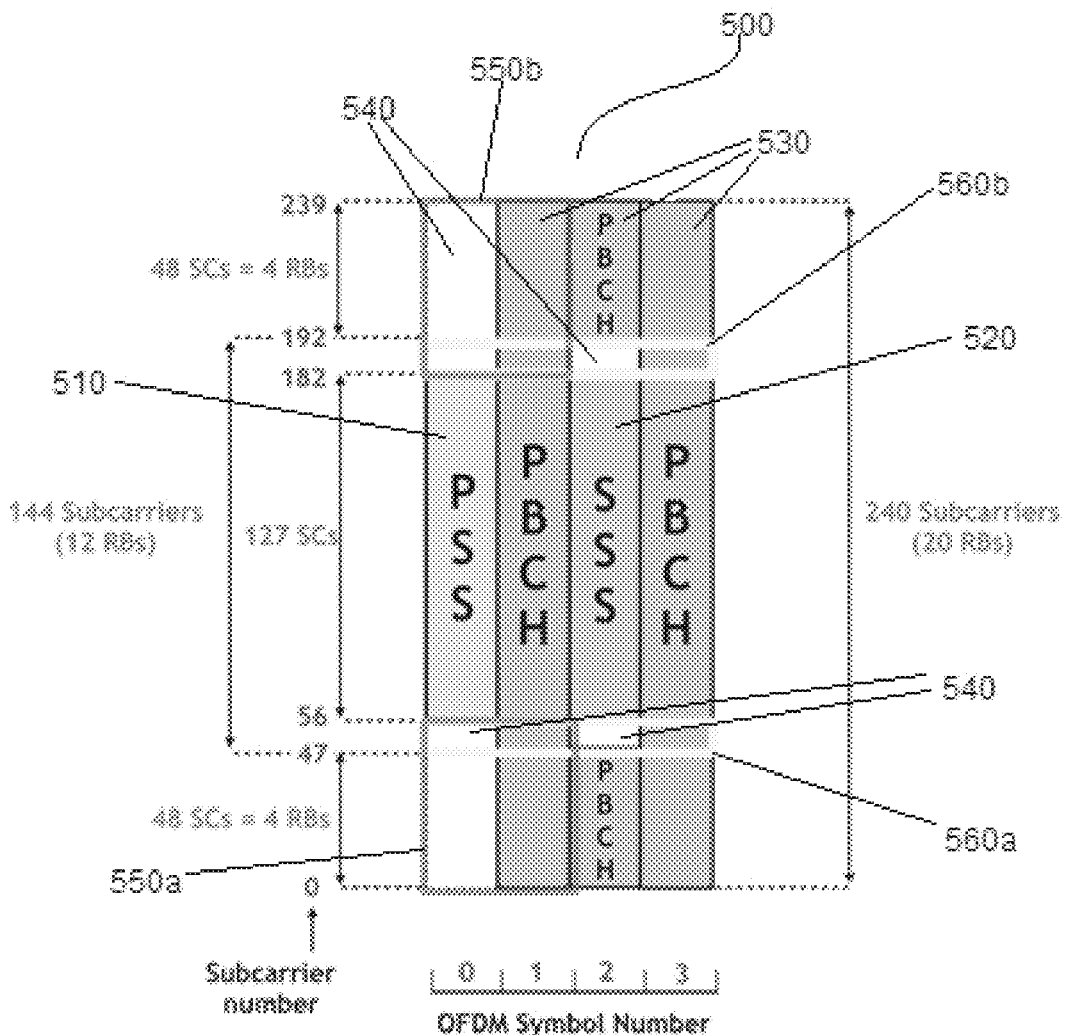
FIG. 5 illustrates in detail the structure of a typical SSB (Synchronization Signal Block, 3GPP 38.211 section 7.4.2 and 7.4.3), normally used for timing alignment, frequency adjustment and MIB (Master Information Block) reception within a wireless communication network with some SSB fragments indicated.

FIG. 5 illustrates in detail the structure of a typical SSB (Synchronization Signal Block, 3GPP 38.211 section 7.4.2 and 7.4.3), normally used for timing alignment, frequency adjustment and MIB (Master Information Block) reception. As described briefly previously, a SSB block 500 comprises:

A PSS (Primary Synchronization Sequence) 510

A SSS (Secondary Synchronization Sequence) 520

A PBCH (Physical Broadcast Channel) block divided across different symbols and subcarriers 530

Unused sub-carriers surrounding the PSS and SSS 540

The white (unused subcarriers) resource elements shown in FIG. 5 are resource elements having an amplitude of zero. The PBCH resource elements comprise resource elements with Quadrature phase shift keying (QPSK) modulation of a constant amplitude. By selecting the resources containing either BPSK or QPSK, the I+Q amplitude is constant=1. So, the transition being noted by a receiver is from an amplitude of 0 to an amplitude of 1, which gives a high power change. If the modulation is, for example, QAM modulation (as used for PDSCH) the amplitude could be lower than 1 leading to a lower power change on transition. That lesser power change could result in a lower sensitivity to detection of a transition.

Some arrangements described use fragments 550a, 550b; 560a, 560b of the SSB block. These parts of the SSB will be referred to as "the SSB fragments". In some arrangements, such fragments of the SSB can be used for timing tracking by an MC-OOK WUR wakeup receiver.

Arrangements described provide a way to perform timing tracking of an SSB by a WUR receiver, thus allowing a UE WUR to maintain coarse timing alignment with, for example, a 5G serving cell whilst a main receiver (5G modem) provided at the UE is powered OFF. Any appropriately selected SSB fragments may be used in support of arrangements as described in more detail below. The timing tracking accuracy provided by arrangements depends on received signal quality and the margin may therefore be adjusted accordingly.

Example Implementation One

According to a first example implementation, the resources 550 of the SSB are used.

Namely:

Frequency range 550a: Subcarrier 0-55

Frequency range 550b: Subcarrier 183-239

OFDM symbols 0 and 1 are used.

Example Implementation Two

According to a second example implementation, the resources 560 of the SSB are used.

Namely:

Frequency range 560a: Subcarrier 48-55

Frequency range 560b: Subcarrier 183-191

OFDM symbols 0 to 3 are used.

The amplitude of the resource elements (RE) in white is 0 and the amplitude of the shaded RE of both resources 550 and 560 is 1. It can therefore be seen that the resources 550 and 560 are characterized by alternating between minimum energy and maximum energy from one symbol to the next. It is these changes in energy level which are inherent in appropriately selected fragments of the existing SSB which can be exploited in support of timing tracking by a WUR.

According to some arrangements, a WUR receiver may be configured to receive a single fragment of the SSB block, for example, by being configured to receive at the center frequency of one of the fragments:

| Fragment | Center frequency | Subcarrier range | OFDM symbols |
|---|---|---|---|
| 550A | ~subcarrier 28 | 0-55 | 0, 1 |
| 550B | ~subcarrier 210 | 183-239 | 0, 1 |
| 560A | ~subcarrier 51 | 48-55 | 0, 1, 2, 3 |
| 560B | ~subcarrier 187 | 183-191 | 0, 1, 2, 3 |

Fragment 550A and 550B are more tolerant to high frequency offsets due to the bigger signal bandwidth, however if a UE is configured to maintain a low frequency offset, for example, due to provision of a better clock crystal, then fragment 560A and 560B may be used. An advantage of fragments 560A and 560B is that there are more transitions (0 to 1) to check against, meaning that detection may be more reliable as long as the frequency offset is low.

According to some arrangements, a WUR receiver provided at a UE may include a low pass filter dedicated filter, which can be selected for reception of the SSB fragment, in the event that a filter used for normal WUS reception is not appropriate, for example, due to a different signal bandwidth for normal WUS messages.

A WUR receiver in accordance with some arrangements may be configured to be able to apply filtering of a selected frequency range, such that impact from subcarriers outside the selected frequency range is negligible. According to such arrangements, the cutoff frequency of the filter is inside the selected frequency range. According to some arrangements, a filter bandwidth may be tunable or adjustable to allow selection of one bandwidth for receipt of the SSB and receipt of another, different, bandwidth for the WUS wakeup signal.

According to some arrangements, a WUR receiver may be configured to receive at the center frequency of the SSB block and use a bandpass filter to receive the two fragments on each side of the center frequency (a single bandpass filter is sufficient). Such an implementation captures signal energy over two separated frequency ranges, which can make the received signal more robust against narrow band channel fading.

According to some arrangements, a WUR receiver may be configured to receive a single fragment. In some implementations, a WUR receiver may be configured alternate between the two frequency ranges 550A and 550B or 560A and 560B to and determine which of the two frequency ranges gives the biggest difference in signal level at the transition from symbol 0 to symbol 1.

According to arrangements, the output of the WUR receiver is expected to toggle from 0 to 1 when receiving across symbol 0 and 1 of an appropriately selected SSB fragment. For fragments 560A and 560B there are 3 alternating transitions between symbol 0, 1, 2 and 3. Ideally a time difference between transitions is well-known. In the examples illustrated, the difference can be equal, for example, to the length of one OFDM symbol, which depends on the selected SCS (subcarrier spacing). The transition point(s) are timestamped at a baseband processor in the WUR receiver. For each reception of the SSB fragment the WUR baseband processor may be configured to check and track the transition point(s). Accordingly, the WUR baseband processor may be configured to use the timestamp of the transition point(s) to be able calculate the location of the WUS occasion, which has a fixed timing offset to the SSB fragment.

Figure 6:
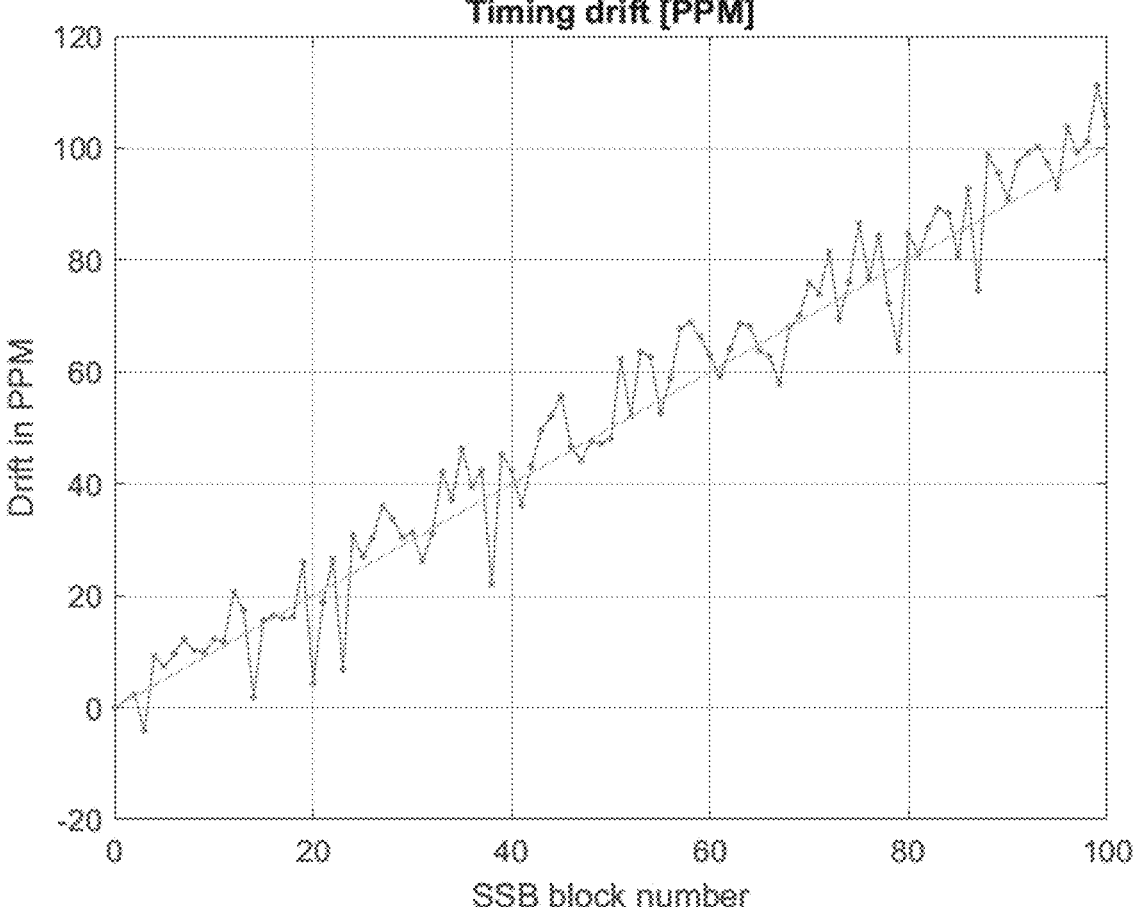
FIG. 6 illustrates graphically a comparison of a simulated timing drift and how a UE with a WUR operating in accordance with an arrangement tracks SSB position.

FIG. 6 illustrates graphically a comparison of a simulated timing drift and how a UE with a WUR operating in accordance with an arrangement tracks SSB position. The results of performed simulations show that a UE with a WUR configured to perform a method in accordance with described arrangements can track the SSB of a gNB with 1 PPM frequency drift between each SSB reception at 0 dB SNR. In the illustrated example, transmitted SSB's were sent through a radio channel modelled as TDL-C with 100 ns delay spread. The straight line shows the ideal and actual accumulated timing drift in PPM since the start of the simulation. The overlaid line shows how a UE having a WUR configured to operate in accordance with arrangements tracks the SSB position over time. In the presented simulations, the SSB position is set to drift by 1 PPM for each SSB reception. It can therefore be understood that arrangements may offer a WUR a way of maintaining synchronization with a network, thereby facilitating operation of the WUR in a discontinuous mode.

Since the simulation indicates that methods in accordance with arrangements can track drift, it will be understood that some implementations may account for such drift.

According to some arrangements, a UE comprising a WUR may be configured to operate such that it adjusts the period between WUR receptions of the SSB fragment(s) according to the estimated drift per SSB. The UE may be configured to estimate drift, for example, by performing an appropriate linear fit on the last n number of detected time stamps. If the UE determines that there is a high drift per SSB it may be configured to decrease a period between WUR receptions of the SSB fragment(s), so that the UE and network remain aligned to facilitate discontinuous WUR operation. Similarly, in some arrangements, if the UE determines that drift is low it may be configured to increase the time period between the WUR receptions of the SSB fragment(s). Adjusting the period of WUR awake periods to monitor the SSB in accordance with drift being experienced can help to ensure that the UE finds a good compromise between the OFF durations of the WUR receiver (and therefore power saving) versus risk of losing synchronization as a result of timing drift between the WUR receptions.

Figure 7:
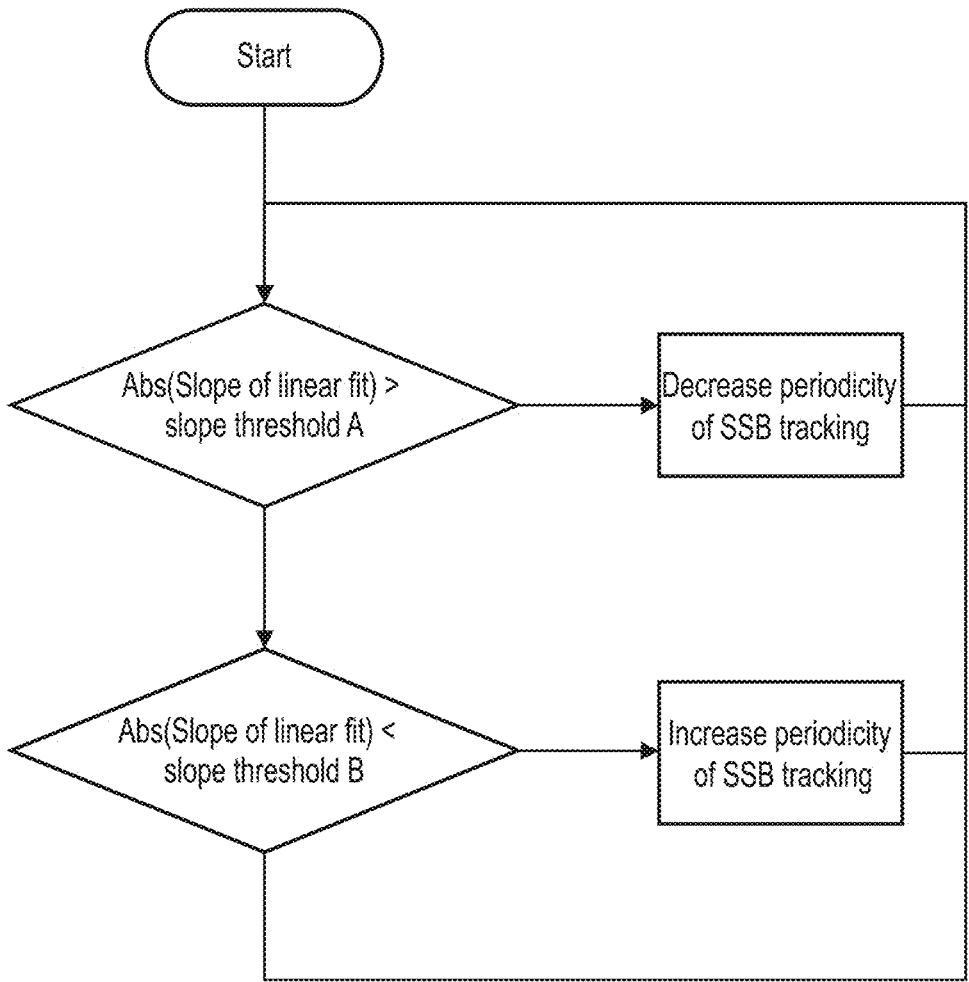
FIG. 7 is a flow chart illustrating schematically main steps for adjusting a period between WUR reception(s) of SSB fragments.

FIG. 7 is a flow chart illustrating schematically main steps for adjusting a period between WUR reception(s) of SSB fragments. As described immediately above, a UE may be configured to assess timing drift per SSB. The UE may be configured to estimate drift, for example, by performing an appropriate linear fit on the last n number of detected time stamps. The UE may be configured to compare the assessed drift against preselected threshold values, selected to balance power saving and functionality. If the UE determines from the gradient of that there is a high drift per SSB (gradient greater than threshold A) it may be configured to decrease a period between WUR receptions of the SSB fragment(s), so that the UE and network remain aligned to facilitate discontinuous WUR operation. Similarly, in some arrangements, if the UE determines that drift is low (less than threshold B) it may be configured to increase the time period between the WUR receptions of the SSB fragment(s). Adjusting the period of WUR awake periods to monitor the SSB in accordance with drift being experienced can help to ensure that the UE finds a good compromise between the OFF durations of the WUR receiver (and therefore power saving) versus risk of losing synchronization as a result of timing drift between the WUR receptions.

According to some arrangements, the gradient of timing drift of a WUR receiver relative to the detected transition in the monitored SSB fragment may be used by the WUR to estimate a frequency error of a reference clock. The calculated error may be used to adjust, correct or realign the reference clock.

According to some arrangements, if the UE determines, for example, as a result of measuring signal strength from a gNB, that it is experiencing poor signal conditions, such that it cannot track the SSB any longer, the UE may be configured to take appropriate action. For example, if the UE determines that the RSRP from the serving gNB is below a threshold, it may be configured to implement a fallback position. The UE fallback positions may comprise: switching to continuous WUS reception (in other words, exiting DRX of the WUR) or activating the main radio receiver and obtaining cell synchronization using the 5G modem.

Since UE which are equipped with both a WUR receiver and a main receiver will be aware that the WUR receiver is not expected to have similar performance to the 5G modem, the UE may be configured to support dynamic switching between use of the WUR receiver and use of the 5G modem. In this way, a UE can use its WUR receiver when the signal conditions allow, but otherwise use the 5G modem.

WUR Integration in UE and Timing Tracking

Figure 8A:
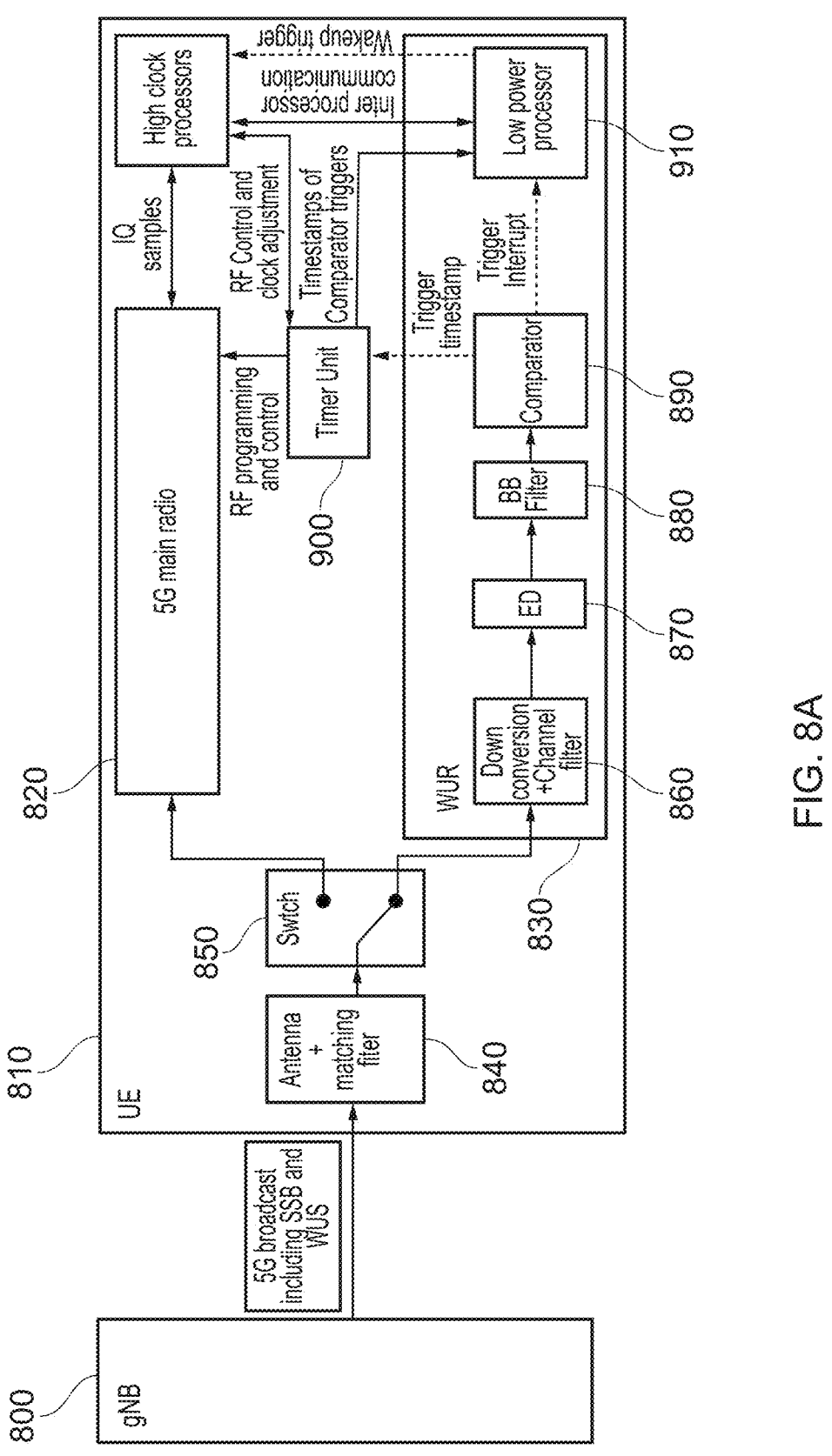
FIG. 8A is a block diagram illustrating schematically one arrangement in which a wakeup receiver is integrated with other subsystems provided at a UE.

FIG. 8A is a block diagram illustrating schematically one arrangement in which a wakeup receiver is integrated with other subsystems provided at a UE.

The simplified block diagram of FIG. 8A illustrates schematically how a broadcast message transmitted by a gNB 800 can be used by a UE 810 equipped with a main receiver 820 and a Wake-Up receiver 830. In particular, according to one arrangement, a SSB fragment can be processed by WUR receiver 830 and various actions may be implemented by the UE 820 in dependence upon reception of the SSB fragment.

In general, the WUR 830 is configured to process the SSB in a similar manner to the way in which it would process a specific WUS.

Figure 8B:
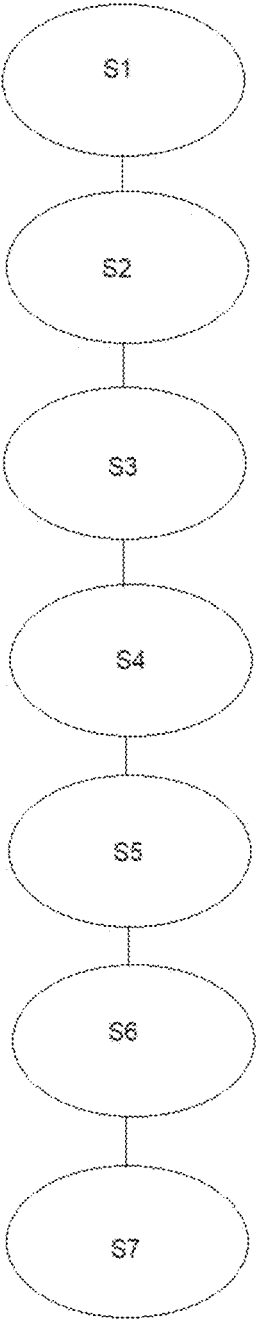
FIG. 8B is a flow chart illustrating schematically the steps of the arrangement shown in FIG. 8A.

In relation to SSB processing, the following steps may occur according to one possible arrangement and as shown schematically in the flowchart of FIG. 8B:

S1: The gNB 800 is configured to broadcast the SSB

S2: An UE antenna 840 and matching filter are provided at the UE to be shared between the main radio 820 and the WUR receiver 830.

S3: A switch 850 is configured to control whether a received signal is routed to the main radio 820 or the WUR receiver 830.

In the illustrated arrangement, the Wake-Up Receiver 830 comprises a down-convertor and channel filter 860. This is theoretically not required as the ED (Envelope Detector) 870 could also work at the RF frequency, but omitting the down converter and filter would require a channel filter with a very high Q (Quality Factor). Filtering after down-conversion has a lower requirement on the Q value and, in addition, it facilitates reuse of the receiver across different bands.

S4: The ED 870 and baseband filter (BB filter) 880 of the WUR 830 is configured to output an envelope of the input signal.

S5: A comparator 890 is configured to compare the input signal with a threshold (average signal level) and registers "high" when the input is above the threshold and likewise registers "low" when the input is determined to be below the threshold.

S6: According to arrangements, each change in output (high to low and vice versa) from the comparator 890 triggers a timer unit 900 to store a timestamp, which can then be used for signal decoding (in the case of reception of a WUS) or a time alignment procedure (in case of reception of a SSB).

S7: A WUR processor 910 may be configured to detect whether there is a transition point at an expected transition point between OFDM symbol 0 and 1 in case of fragment 550A and 550B. For the other fragments, 560A and 560B, detection of additional transition points between symbols 1&2 and 2&3 can be verified.

In use, if a UE transitions from using the main receiver 820 to a power saving mode in which the WUR 830 is used, immediately after switching the main receiver 5G modem OFF, the timing of a transition point in a SSB fragment will be known to the UE with high accuracy. According to arrangements, the WUR processor 910 may be configured to start to track the transition point, which may be achieved by tracking the timing position at which the output of the comparator 890 changes from low to high. To avoid detecting false transition points, only transitions happening in a small timing window around an expected transition point may be accepted. The window is found by:

$$|t_{detected} - t_{expected}| < n \cdot t_{driftPerRX}$$

where $t_{detected}$ is the actual detected transition point.

$t_{expected}$ is the predicted transition point assuming no timing drift.

$t_{driftPerRX}$ is the estimated drift per RX.

n is a multiplier to allow the drift to have some jitter/uncertainty on top of the maximum allowed timing drift.

$t_{driftPerRX}$ can, for example, be calculated by doing linear extrapolation on the latest values of $t_{detected}$.

The WUR processor 910 may be configured to estimate the drift of the $t_{detected}$. Based on that estimation, the WUR processor may adapt the $t_{expected}$ of the next SSB transition accordingly. Furthermore, based on the timing calculations performed by the processor 910, the timing of a WUS occasion, where the receiver 830 is operating in a DRX mode, can be adapted.

In an alternative arrangement, a UE 810 may be configurable to use both of the fragments (either 550A, 550B or 560A, 560B), by down-converting the center of the SSB to baseband. A UE in accordance with such an arrangement may be configured to apply a bandpass filter to such a down-converted signal to select the relevant fragments. According to some arrangements, a UE 810 may be configured such that in good signal conditions, UE may only apply a lowpass filter, which will still give a detectable power difference of approximately 3 dB (in symbol 0, 127 subcarriers are active, in symbol 1, 240 subcarriers are active, so almost double number of active carriers in symbol 1 versus symbol 0) when the noise/interference level is low.

Simulation

An illustrative example demonstrating, with reference to FIG. 9, that methodologies in accordance with arrangements can perform reliable timing tracking at low SNR is set out below.

Simulations have been performed for the case where fragment 550A is monitored by a WUR. It should be noted that the method of arrangements may not support reliable time tracking when experiencing poor signal conditions, or for example, if the WUS signal is close to its sensitivity level. In this case, where the UE is aware that the WUR is operating at the edge of sensitivity and the signal level is below the level at which the timing tracking is reliable, the UE may be configured to move the WUR to continuous reception.

The WUR may be configured such that the SSB fragment is down-converted to baseband, and a Low Pass (LP) filter can be used to remove the signal outside the wanted signal. One example suitable LP filter comprises a $6^{th}$ order Butterworth filter with a cutoff frequency at 195 kHz resulting in ~40 dB attenuation of the signal energy outside the SSB fragment.

Figure 9:
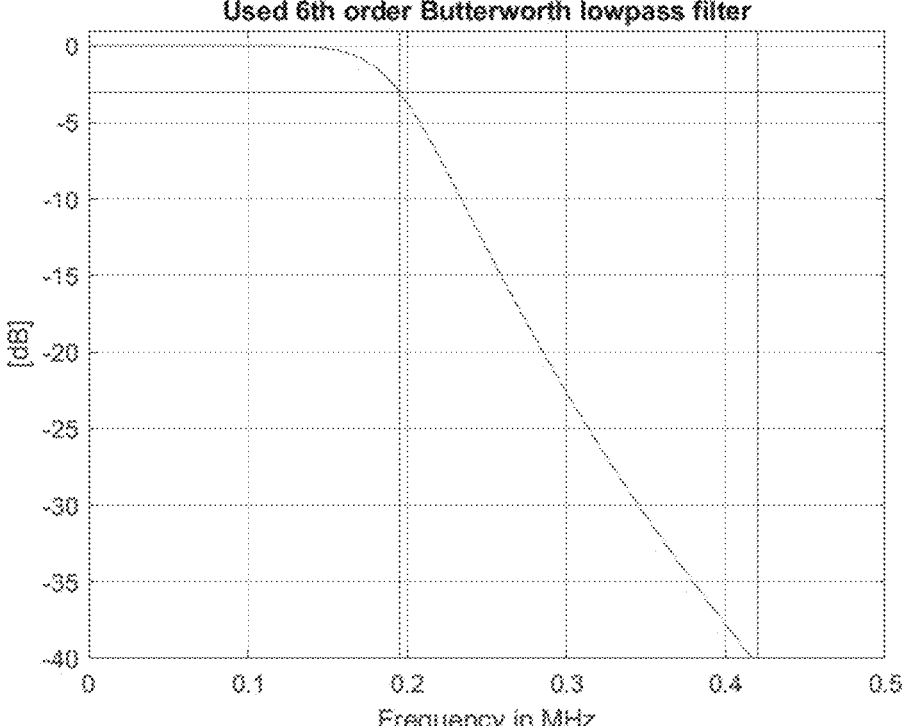
FIG. 9 illustrates the operational characteristics of a suitable Low Pass filter according to an arrangement.

FIG. 9 illustrates the operational characteristics of a suitable Low Pass filter according to an arrangement. The bandwidth of the SSB fragment 550A is:

(56 subcarriers×15 kHz/subcarrier)/2=420 kHz.

The simulations were performed both with 0 kHz frequency offset and a 50 kHz frequency offset. In both cases, a method in accordance with arrangements was able track timing drift at SNR levels as low as 0 dB. The simulations therefore confirm that methods in accordance with arrangements are not significantly sensitive to frequency offset, since the detection is based on ON-OFF keying where the symbols are derived from a change in signal power. When the frequency offset is relatively small compared to the bandwidth of the SSB fragment (420 kHz) then the power is not significantly impacted.

Other Points

Arrangements are provided in which a broadcast message already being transmitted within the network can be used to track and synchronize timing at a UE comprising a main receiver and a WUR. Implementation of such arrangements can mean that a network does not have to spend radio resources on provision of a dedicated WUS beacon. Provision of a WUS beacon can be expensive to a network in terms of radio resources since it requires appropriate MC-OOK modulation and a short periodicity of WUS beacon to maintain alignment. Aside from overheads in allocating resources for WUS beacon transmission, a gNB would also have to consider which of its resources could be subject to interference by any WUS beacon broadcast by neighboring cells. Such extra interference resulting from a dedicated WUS beacon can be avoided if reusing the SSB to provide WUS beacon functionality.

By implementing methods in accordance with described arrangements, a UE can use discontinuous reception for the WUR receiver, thereby achieving significant power saving, even if the network has decided not to provide a WUS beacon for the WUR to stay time aligned to.

By way of power saving, assuming that a UE needs to:
(i) receive a WUS occasion of 5 ms duration, $t_{WUS\text{-}wakeup}$, every 1 second
(ii) Receive an SSB fragment of 4 symbols duration, $t_{SSB\text{-}fragment}$, every 2 seconds to stay time aligned and
(iii) The UE needs a 5 ms warmup, $t_{warmup}$, time before each of the receptions.

With these assumptions, then the WUR active time will be:

$$\text{Active time} = \frac{2 \cdot (t_{WUS\text{-}wakeup} + t_{warmup}) + 1 \cdot (t_{SSB\text{-}fragment} + t_{warmup})}{2\,\text{seconds}}$$

$$= \frac{2 \cdot (5\,\text{ms} + 5\,\text{ms}) + 1 \cdot (280\,\text{us} + 5\,\text{ms})}{2\,\text{seconds}}$$

$$= 1,3\%$$

Thus offering a significant power saving compared to an "always-on" WUR configuration.

Figure 10:
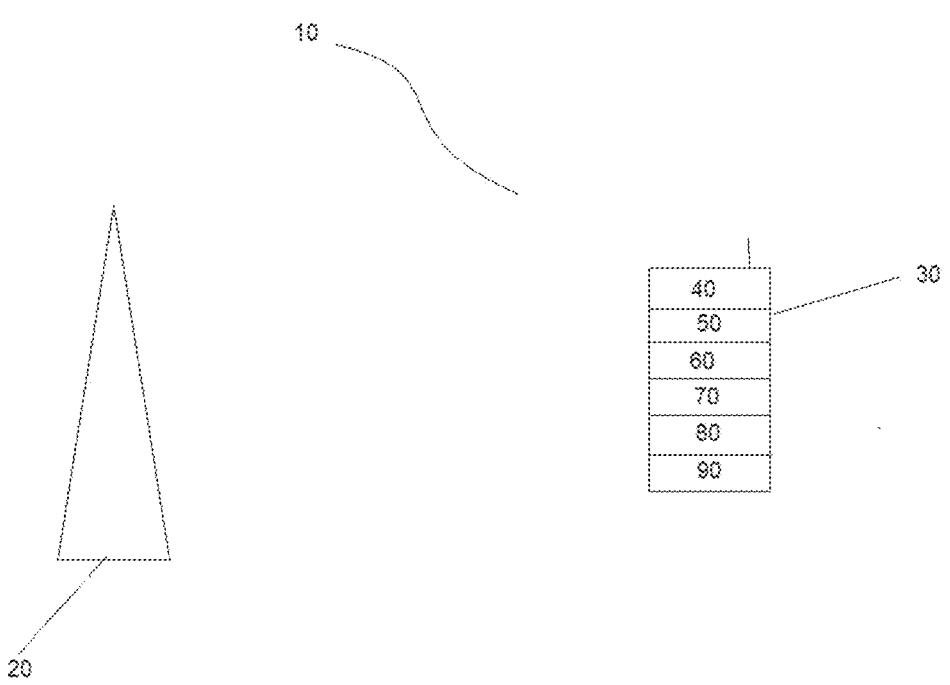
FIG. 10 shows apparatus in a communication system according to an example arrangement.

FIG. 10 shows apparatus in a communication system according to an example embodiment. In particular, FIG. 10 illustrates a wireless communication network 10 in which a transmitting network node 20 s configured to communicate with a UE 30 equipped with a Wake-Up receiver and a main radio receiver. The transmitting node may comprise a base station, for example, a gNB, or similar.

A UE 30 in accordance with one example embodiment may comprise: a wake-up signal receiver 40; a main radio receiver 50; and a timer 60. The wake-up signal receiver 40 comprises: circuitry 70 configured to receive at least a portion of a broadcast message; circuitry 80 to evaluate the received portion of the broadcast message to determine a time marker; and circuitry 90 configured to provide the time marker to the timer.

Figure 11:
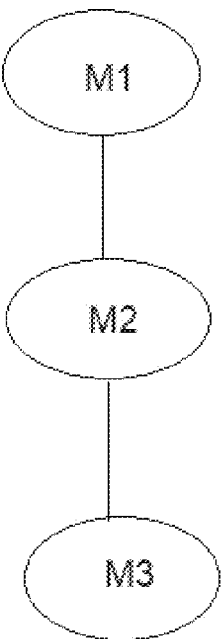
FIG. 11 shows a flow diagram illustrating steps in methods performed at network nodes according to some example arrangements.

FIG. 11 shows a flow diagram illustrating steps in methods performed at network nodes according to some example embodiments as shown in FIG. 10.

In particular, UE 30 may be configured to perform the steps of:
M1: receiving at least a portion of a broadcast message;
M2: evaluating the received portion of the broadcast message to determine a time marker; and
M3: providing the time marker to the timer.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods. The term non-transitory as used herein, is a limitation of the medium itself (i.e., tangible, not a signal) as opposed to a limitation on data storage persistency (e.g. RAM vs ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although example embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
a main radio receiver;
a wake-up signal receiver; and
a timer;
wherein the wake-up signal receiver comprises: at least one processor; and at least one memory storing instructions that, when executed by the at least one processor, cause the apparatus to:
receive at least a portion of a broadcast message;
evaluate the received portion of the broadcast message to determine a time marker; and
provide the time marker to the timer,
wherein the evaluation of the received portion of broadcast message to determine the time marker is based upon an evaluation of a transition in the received portion between resource elements having zero amplitude and resource elements having a constant amplitude.

2. An apparatus according to claim 1, wherein the portion of the broadcast message comprises a frequency range having a region in a time domain comprising resource elements having zero amplitude and an adjacent region in the time domain comprising resource elements having a constant amplitude.

3. An apparatus according to claim 2, wherein the constant amplitude comprises substantially maximum amplitude.

4. An apparatus according to claim 1, wherein the broadcast message comprises a message regularly transmitted within the network with a known period between transmissions, and optionally wherein the broadcast message comprises a Synchronization Signal Block SSB.

5. An apparatus according to claim 1, wherein the receiving at least a portion of the broadcast message comprises filtering by a filter a received signal, and selecting a signal bandwidth centred upon a centre of the portion of the broadcast message.

6. An apparatus according to claim 5, wherein the filter comprises a low pass filter dedicated filter, and optionally wherein the filter comprises a bandpass filter; and optionally wherein the filter bandwidth is adjustable.

7. Apparatus according to claim 1, wherein evaluation of the received portion of the broadcast message to determine a time marker is by determining a time marker in relation to a series of received portions of broadcast message.

8. Apparatus according to claim 1. wherein the apparatus is configured to:
means te-compare timing kept by the timer to timing determined from time markers determined in relation to a series of received portions of broadcast message.

9. Apparatus according to claim 1, wherein the apparatus comprises:
further configured to estimate a frequency error of a reference clock of the timer based upon a comparison of timing kept by the timer to timing determined from time markers determined in relation to a series of received portions of broadcast message.

10. Apparatus according to claim 1, wherein the apparatus is configured to adjust timing kept by the timer based upon the estimated frequency error.

11. An apparatus according to claim 1, wherein the apparatus is configured to adjust how often the wake-up receiver is awake to receive the portion of the broadcast message.

12. An apparatus according to claim 11, wherein the adjustment how often the wake up receiver is awake is configured to adjust a period between wake ups in dependence upon the linear fit to the time markers determined in relation to the series of received portions of broadcast message.

13. A method, performed by a wake-up signal receiver of an apparatus comprising a main radio receiver, the wake-up signal receiver; and a timer, the method comprising:

receiving at least a portion of a broadcast message;

evaluating the received portion of the broadcast message to determine a time marker; and providing the time marker to the timer, wherein evaluating the received portion of broadcast message comprises: determining the time marker based upon an evaluation of a transition in the received portion between resource elements having zero amplitude and resource elements having a constant amplitude.

14. A method according to claim 13, wherein the portion of the broadcast message comprises a frequency range having a region in a time domain comprising resource elements having zero amplitude and an adjacent region in the time domain comprising resource elements having a constant amplitude.

15. A method according to claim 14, wherein the constant amplitude comprises substantially maximum amplitude.

16. A method according to claim 13, wherein the broadcast message comprises a message regularly transmitted within the network with a known period between transmissions, and optionally wherein the broadcast message comprises a Synchronization Signal Block SSB.

17. A method according to claim 13, wherein the receiving at least a portion of the broadcast message comprises filtering by a filter a received signal, and selecting a signal bandwidth centred upon a centre of the portion of the broadcast message.

18. A method according to claim 17, wherein the filter comprises a low pass filter dedicated filter, and optionally wherein the filter comprises a bandpass filter;

and optionally wherein the filter bandwidth is adjustable.

* * * * *